United States Patent [19]

Tong

[11] Patent Number: 5,169,036
[45] Date of Patent: Dec. 8, 1992

[54] GRANULAR-LIQUID HAND-HELD DISPENSER

[76] Inventor: Vincent L. Y. Tong, 33250 Lake Oneida St., Fremont, Calif. 94555

[21] Appl. No.: 850,750

[22] Filed: Mar. 13, 1992

[51] Int. Cl.⁵ .............................................. B65D 88/54
[52] U.S. Cl. .................................... 222/339; 222/363
[58] Field of Search ............... 222/363, 368, 438, 449, 222/454, 452, 339, 364

[56] References Cited

U.S. PATENT DOCUMENTS

| | | | |
|---|---|---|---|
| 1,401,412 | 12/1921 | Klein . | |
| 2,059,135 | 10/1936 | Moe | 221/106 |
| 2,611,516 | 9/1952 | Beldner | 222/363 X |
| 2,770,401 | 11/1956 | Brenner et al. | 222/363 X |
| 3,318,491 | 5/1967 | Williamson | 222/363 |
| 4,102,477 | 7/1978 | Yoon | 222/452 X |
| 4,266,695 | 5/1981 | Ruperez | 222/339 X |
| 4,376,499 | 3/1983 | Ostergaard | 222/339 |

*Primary Examiner*—Gregory L. Huson
*Attorney, Agent, or Firm*—Skjerven, Morrill, MacPherson, Franklin & Friel

[57] ABSTRACT

A dispenser for granular material or liquid includes a dispenser housing attached to a granular material/liquid-holding container. The housing has a hemispherical distal end including an exit port and a curved linear slot. A spherical casing having a common inlet/outlet port and an attached lever arm riding in the slot is positioned in the distal end of the housing so that in a fill position a measured quantity of the granular material/liquid passes from the container and fills a predetermined volume or two incremental volumes within the casing. Upon hand and finger movement of the lever arm to a first or second position the casing is sealingly rotated to a dispense position with cessation of access of material from the container and with the casing inlet/outlet port then aligned for at least partially aligned with the housing exit port. The measured volume or volumes then flow from the casing by gravity. The dispenser is held in an at least partial inverted position during the fill and dispense modes of operation. A leaf spring, which is cocked upon rotating motion of the lever arm and casing, positively returns the casing and lever arm to the fill position when the lever arm is released by the user after dispensing such measured quantity of the material.

6 Claims, 2 Drawing Sheets

GRANULAR-LIQUID HAND-HELD DISPENSER

FIELD OF THE INVENTION

This invention pertains to a hand-held dispenser for dispensing a measured amount of granular material or liquid. More particularly, the invention is directed to a dispenser which in one position of an interior casing, allows granular material or liquid to fill a predetermined volume in the casing and in a rotated second position dispenses a thus measured quantity of the granular material or liquid from that casing volume.

BACKGROUND OF THE INVENTION

In most homes and kitchens when cooking or preparing or serving food, one desires a measured amount of granular material, including powders, or liquid. Most homes either have sets of spoons or cups which when filled from a pour dispenser or box result in a measured teaspoon, half teaspoon, two teaspoon, tablespoon, quarter cup, half cup, etc. of the measured material or liquid. In many cases a conventional teaspoon is used as a receptacle for the material or liquid but this easily tilts spilling material. U.S. Pat. No. 1,401,412 describes a liquid faucet in which a cup-shaped valve is rotatably movable in a spherical casing for dispensing a charge of a pressurized soft drink. U.S. Pat. No. 2,059,135 shows a dispensing device attached to a fixed hopper including a cylindrical dispensing head with diametrically disposed slots. The head is fillable in a horizontal position and dispenses a quantity of material in a vertical position. U.S. Pat. 4,102,477 describes a sugar dispensing apparatus employing a rotatable spout but which, while dispensing a presumed measured amount of material, inherently allows an inflow of additional material (sugar) from the container as dispensing commences.

SUMMARY OF THE INVENTION

Accurate measurement of a fixed amount of condiment such as a spice, or sugar or other edible solid or liquid component, has significance not only in closely following a recipe in food preparation, but also is important to those closely watching their dietary intake and accurately controlling caloric intake. There is convenience in providing a hand-held dispenser which accurately measures a fixed amount of a food material without having a separate measurement instrument such as a spoon. This avoids repeated handling and washing and possible misplacement or loss.

The present invention provides a dispenser housing which is detachably connected to an open-end of a generally cylindrical container for the material to be dispensed. Tapered, conical or other shaped containers including those dictated by aesthetic considerations may be employed. The dispenser housing has an essentially hemispherical shaped end including a curved linear slot and a juxtaposed exit port. A rotatable spherical casing, positioned in the housing spherical end, includes a common inlet/outlet port and a lever arm movable along the linear slot to a first fill position allowing flow of a predetermined volume of a granular material or liquid from the container into the spherical casing through the inlet/output port when the attached container and dispenser housing is at least partially inverted. Upon movement of the lever arm to a second position, the inlet/outlet port is rotated out of alignment with the container to a position relative to the slot such that the inlet/outlet port is essentially aligned or partially aligned in the preferred embodiment with the exit port of the dispenser housing end.

While holding the container/dispenser housing in an essentially inverted position, a premeasured quantity of the granular material or liquid exits by gravity from the spherical casing. The spherical casing includes a chordal partition which subtends an arc formed by portions of the spherical casing on either side of the inlet/outlet port to form a fixed predetermined volume for receipt of granular material or liquid in the spherical casing. In the preferred embodiment an angular wall extends from the chordal partition to a distal position medially of the inlet/outlet port to divide the fixed predetermined volume into two separate incremental volumes, for example each being a one-half teaspoon in volume. Movement of the lever arm to open the dispenser in a first or second amount for discharge of a measured volume or volumes of granular material, for example, a measured half teaspoon or both of two half teaspoons, i.e. a full teaspoon, automatically cocks an associated spring which when the user releases the finger-operated lever arm, returns the spherical casing to the first fill position preventing any undesirable spilling or discharge of the container contents. The lever arm may be moved to a first position to dispense a half amount or to a second position to dispense double that amount without the necessity of any additional mechanism or control feature dictating the amount to be filled and dispensed.

The dispenser housing further includes an elastomeric or other sealing ring which prevents egress of container granular material or liquid in the event the dispenser/container is inadvertently or purposely placed in other than a vertical upright position and prevents ingress of moisture or foreign contaminant in the first fill position or in the vertical upright position. The associated spring in the preferred embodiment is a leaf spring hooked at one end over a distal end portion of the dispenser housing and hooked at the other end on an exterior loop of the spherical casing.

DETAILED DESCRIPTION

Figure 1:
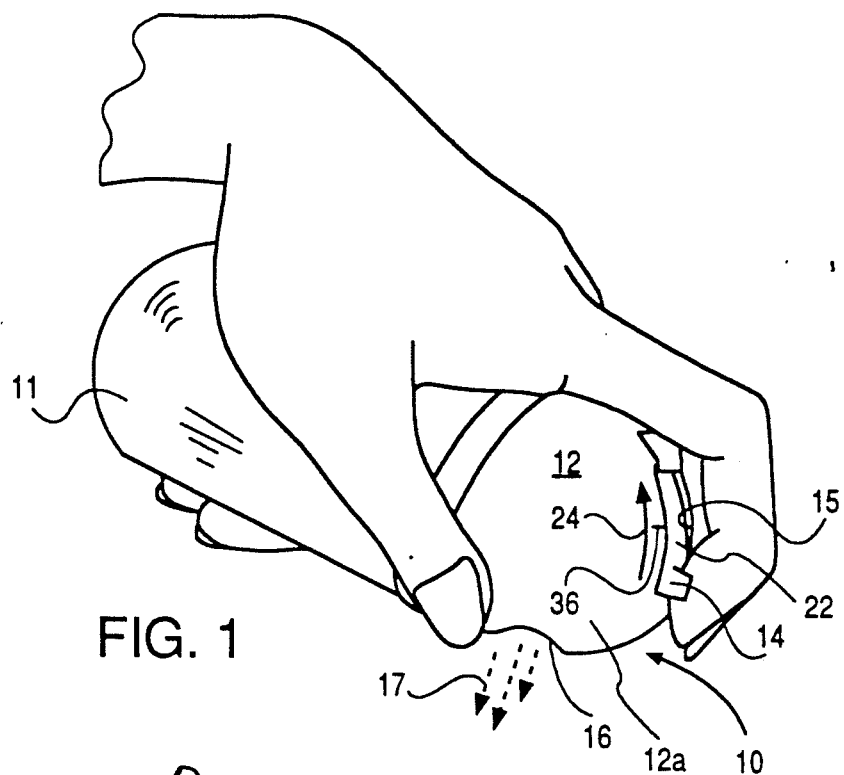
FIG. 1 is a perspective view of the dispenser/container immediately prior to dispensing a measured volume.
Figure 2:
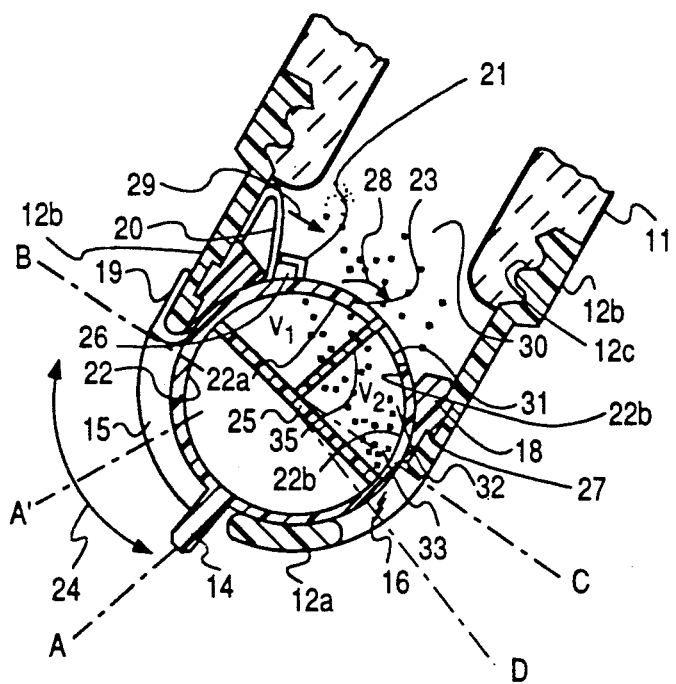
FIG. 2 is a cross-sectional view of the dispenser housing in a partially inverted first fill position.
Figure 3:
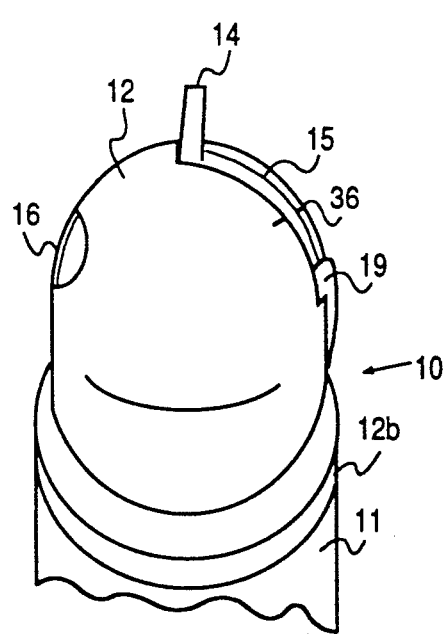
FIG. 3 is an angular elevational view of the dispenser housing.

FIGS. 1 and 3 illustrate a hand-held dispenser 10 including a dispenser housing 12 having a generally hemispherical distal end 12a and an inner cylindrical portion 12b attached as by screw thread 12c or other connection to a cylindrical container 11 at a container open-end. In a first fill position the dispenser is inverted to fill a fixed volume 32 within a spherical casing 22 rotatable within the dispenser housing 12. A lever arm 14 extends integrally from casing 22 and is movable in a curved (in side view) linear (in longitude) slot 15 to move the arm 14 and the interior spherical casing 22 from a first fill position A to a second dispensing position B as illustrated by movement arrow 24 which in turn fully aligns an inlet/outlet port 23 (FIG. 2) of casing 22 with an exit port 16, in the dispenser housing 12 and allows gravity flow (dashed arrow 17) of the granular material or liquid from volumes $V_1$ and $V_2$ of the dispenser when the dispenser in an at least partial inverted position The lever arm may also be moved to an intermediate position A' marked by indicia 36 on opposite side edges of slot 15 so that only a half-volume $V_2$ of granular material is dispensed. Such half volume is provided by the incorporation of a fixed angular wall 35 extending outwardly from chordal partition 25 to a distal position medially of inlet/outlet port 23 to divide the overall volume 32 into two half volumes $V_1$ and $V_2$ each for example forming a half teaspoon volume or other volume. In dispensing volume $V_2$ the wall 35 is at position C and when dispensing both volumes $V_1$ and $V_2$ the wall 35 is at position D (FIG. 4) with the lever arm being at position B. Positioning of the lever arm 14 protruding from the hemispherical end of the dispenser housing permits a user to both grasp the dispenser in one hand and operate the lever arm by the index finger of that hand by pulling the lever arm backward to position A' or position B to dispense either a half or full a measure of material, respectively.

FIG. 2 shows the dispenser in an inverted orientation with an inlet/outlet port 23 aligned with the container open end and in position to receive by gravity flow, in a "fill" mode of operation, granular material 30 from the container 11 by that material free-flowing at 31 through the inlet/outlet port 23 into a fixed volume 32 along both sides of angular wall 35. The overall volume 32 is formed by a fixed chordal partition 25 and arc portions 22a and 22b of the casing 22. The material to be dispensed settles by gravity to form two measured half teaspoons or other desired measures of settled granular material 33. Dependent on the position of lever arm 14 in the "dispensing" mode of operation at position A, or position B, either a half teaspoon $V_2$ or both half teaspoons V and $V_2$ will be dispensed, respectively, from the dispenser when it is partially inverted as shown in FIG. 4.

Figure 4:
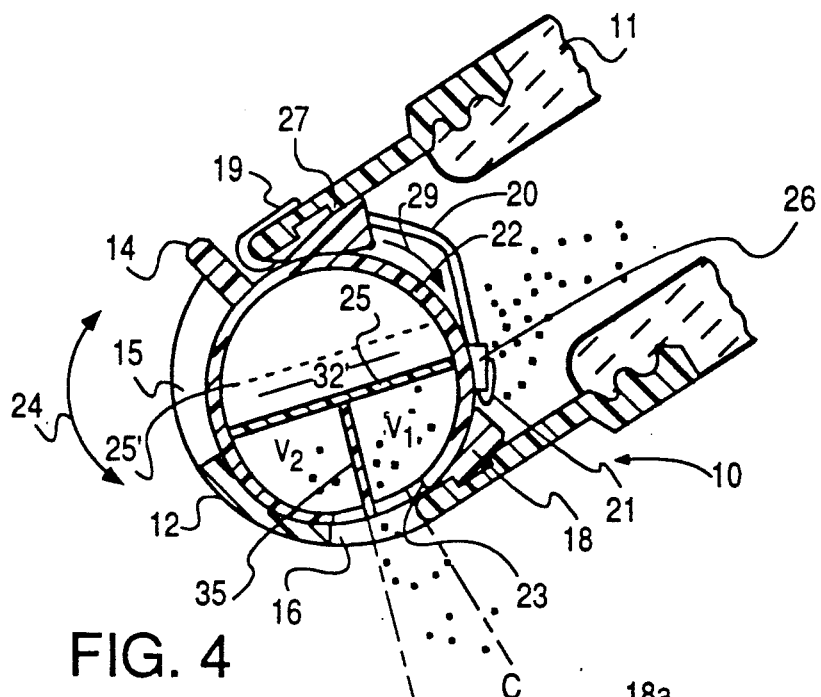
FIG. 4 is a cross-sectional view of the dispenser housing in a partially inverted second dispensing position.

As best seen in FIG. 4, a leaf spring 20 has a first hook end 21 engaged with an exterior integral loop 26 of the casing 22 and a second hook end 19 engaged with an end edge of slot 15 in the dispenser housing 12. When lever arm 14 is rotated clockwise in slot 15 from position A to position A' or to position B toward hook end 19, the casing 22 is rotated so that inlet/outlet port 23 moves clockwise sealing off any access between container 11 and volume 32. Exterior surfaces of portions 22b and 22a sealingly rotate against an elastomeric ring seal 18 captured in a groove 27 in a cylindrical portion 12b of housing 12. As lever arm 14 approaches the end of slot 15 to position B adjacent to hook end 19, inlet/outlet port is then fully aligned with exit port 16 permitting dispensing of all the material in volumes $V_1$ and $V_2$ when the dispenser is in an at least partially inverted position during the dispensing mode of operation. When the lever arm is at position A, lined up with indicia 36, only one-half of volume 32 (the half to the right of angular wall 35 namely volume $V_2$ in FIG. 2) is aligned with exit port 16 allowing only that half volume $V_2$ to be dispensed. The rotary clockwise motion of casing 22 is illustrated by arrow 28.

As seen in FIG. 4 the rotary motion also cocks or expands spring 20 as indicated by arrow 29 such that when lever arm 14 is released by finger removal at the dispense position B adjacent to spring hook end 19 or at position A', the expanded spring retracts and moves casing 22 counterclockwise, so that the then empty chamber volume 32 returns automatically to the FIG. 2 fill position.

FIG. 4 also shows by dash line 25' a second position of fixed partition 25 which would afford a greater measured volume 32, of granular material or liquid to be dispensed, for example a tablespoon of material or liquid. It is contemplated that a user may interchange a dispenser housing 12 having one measure volume 32 for a housing having another volume 32, by threading either on the same container 11.

Casing 22 and housing 12 are made of acrylic plastic, glass, ceramic or metal. Container 11 also may be made of plastic, glass, ceramic or metal. Granular materials such as sugar, salt, baking soda or ice-tea mix or instant coffee mix and liquids such as soy sauce, cream, or cooking oil may be dispensed.

Figure 5:
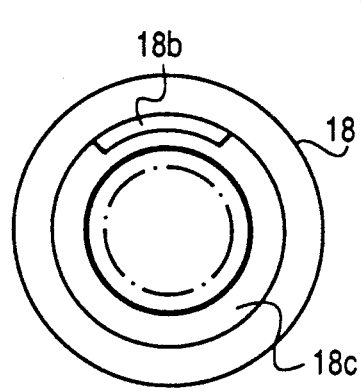
FIG. 5 is a plan view of the dispenser housing sealing ring per se.
Figure 6:
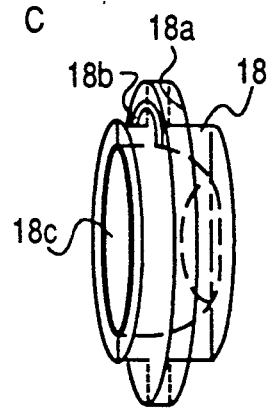
FIG. 6 is a perspective side view of the sealing ring per se.

FIGS. 5 and 6 illustrate the cylindrical seal 18 which includes a cylindrical rim 18a which fits within and holds the seal in groove 27, a through-aperture 18b for passage of hook end 19 and a sealing/bearing annular spherically-curved sealing band 18c having an internal diameter corresponding to the outer diameter of the casing and in which the casing 22 sealingly rotates. Seal 18 may be made of rubber, a plastic elastomeric material or other material which is compatible with the granular materials/liquid being dispensed.

Figure 7:
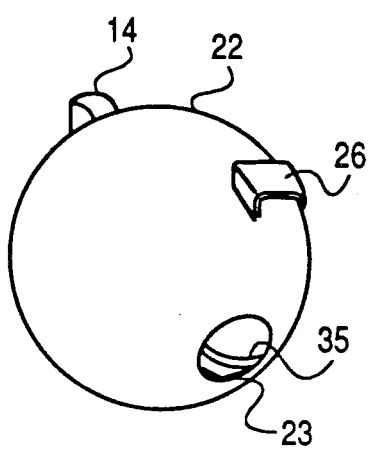
FIG. 7 is a perspective view of the spherical casing.
Figure 8:
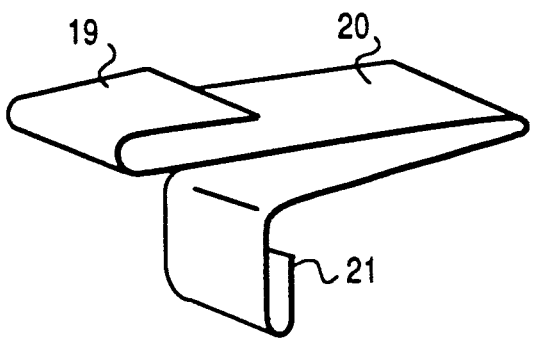
FIG. 8 is a perspective view of the leaf spring per se.

FIG. 7 shows an exterior view of casing 22, inlet/outlet port 23 and the exterior integral hook loop 26. The outer periphery of angular wall 35 separating volume 32 into two equal or other volumes $V_1$ and $V_2$ is also shown. FIG. 8 shows the leaf spring 20 per se with hook ends 19 and 21. The spring is preferably made from non-corrosive material with a sufficient spring rate to return the inlet/outlet port 23 of casing 22 to a position facing the open end of container 11.

The above description of the preferred embodiment of this invention is intended to be illustrative and not limiting. Other embodiments of this invention will be obvious to those skilled in the art in view of the above disclosure.

I claim:
1. A granular material/liquid dispenser for dispensing a measured quantity of a free-flowing granular material or liquid confined in a hand-holdable container having an open-end, said dispenser comprising:
 a dispenser housing;
 means at an open end of the dispenser housing for detachably connecting the dispenser housing to the open-end of the container;
 an end of the dispenser housing being hemispherical and extending oppositely and distally from the dispenser housing open end, said hemispherical distal end including a curved slot and a juxtaposed exit port;
 a spherical hollow casing having a common inlet/outlet port positioned in said housing hemispherical distal end and a lever arm extending integrally from an outer surface of said spherical hollow casing and movable in said housing hemispherical end curved slot, said lever arm in a first fill position allowing flow of a predetermined volume of a granular material or liquid into said spherical hollow casing through said inlet/outlet port and in a second dispensing position allowing flow of the predetermined volume of granular material or liquid in said spherical hollow casing out through said casing inlet/outlet port when said casing inlet/outlet port has been at least partially aligned with said housing exit port and after further flow of granular material or liquid into said spherical hollow casing is blocked;

seal means for rotatively sealing said spherical hollow casing in said dispenser housing; and further comprising a fixed first partition extending across and sealing off a predetermined interior volume of said spherical hollow casing inwardly of said common inlet/outlet port, said predetermined volume being representative of a fixed amount of granular material or liquid to be dispensed.

2. The dispenser of claim 1 further comprising a leaf spring having one end connected to and extending from said spherical holder casing and a second end attached to said dispenser housing such that after release of said lever arm at the second dispensing position, said lever arm and said spherical holder casing are returned by spring force to the first fill position.

3. The dispenser of claim 2 in which said leaf spring extends through and is held by a portion of said seal means, and said leaf spring one end is hooked to an exterior loop on said spherical hollow casing and said leaf spring second end is hooked over a distal end portion of said dispenser housing.

4. The dispenser of claim 1 further comprising a second partition fixed to said first partition and forming interior volumes representative of different fixed amounts of granular material or liquid to be dispensed.

5. The dispenser of claim 1 wherein said second partition comprises a fixed angular wall extending from said first partition to a distal position medially of said inlet/outlet port such that the interior volumes are divided into two equal incremental volumes.

6. The dispenser of claim 5 wherein said lever arm is movable to an intermediate position to dispense only one of said incremental volumes.

* * * * *

UNITED STATES PATENT AND TRADEMARK OFFICE
CERTIFICATE OF CORRECTION

PATENT NO.   :   5,169,036
DATED        :   12/08/92
INVENTOR(S)  :   Vincent L.Y. Tong It is certified that error appears in the above-identified patent and that said Letters Patent is hereby corrected as shown below:

Col. 5, line 22, delete "holder" and insert --hollow--.

Col. 6, line 2, delete "holder" and insert --hollow--.

Signed and Sealed this

Second Day of November, 1993

Attest:

BRUCE LEHMAN

Attesting Officer

Commissioner of Patents and Trademarks